US012483437B1

(12) United States Patent
Libin

(10) Patent No.: US 12,483,437 B1
(45) Date of Patent: *Nov. 25, 2025

(54) RECOGNIZING AND MITIGATING DISPLAYS OF UNACCEPTABLE AND UNHEALTHY BEHAVIOR IN IMMERSIVE VIDEO RECORDINGS

(71) Applicant: mmhmm inc., Bentonville, AR (US)

(72) Inventor: Phil Libin, Bentonville, AR (US)

(73) Assignee: mmhmm inc., Bentonville, AR (US)

( * ) Notice: Subject to any disclaimer, the term of this patent is extended or adjusted under 35 U.S.C. 154(b) by 296 days.

This patent is subject to a terminal disclaimer.

(21) Appl. No.: 18/144,306

(22) Filed: May 8, 2023

Related U.S. Application Data

(63) Continuation-in-part of application No. 18/122,749, filed on Mar. 17, 2023, now abandoned, which is a continuation of application No. 17/226,315, filed on Apr. 9, 2021, now Pat. No. 11,632,258.

(60) Provisional application No. 63/008,769, filed on Apr. 12, 2020.

(51) Int. Cl.
| | |
|---|---|
| *H04L 12/18* | (2006.01) |
| *G06F 1/16* | (2006.01) |
| *G06F 3/16* | (2006.01) |
| *G06F 18/214* | (2023.01) |
| *G06N 20/00* | (2019.01) |
| *G06V 20/40* | (2022.01) |
| *G06V 40/10* | (2022.01) |
| *G06V 40/16* | (2022.01) |

(Continued)

(52) U.S. Cl.
CPC .......... *H04L 12/1831* (2013.01); *G06F 1/163* (2013.01); *G06F 3/165* (2013.01); *G06F 18/214* (2023.01); *G06N 20/00* (2019.01); *G06V 20/46* (2022.01); *G06V 40/107* (2022.01); *G06V 40/172* (2022.01); *G06V 40/28* (2022.01); *G08B 3/10* (2013.01)

(58) Field of Classification Search
CPC .... H04L 12/1831; G06N 20/00; G06V 20/46; G06V 40/28; G06V 40/107; G06F 1/163; G06F 3/165; G06K 9/6256
USPC ........................................................ 709/204
See application file for complete search history.

(56) References Cited

U.S. PATENT DOCUMENTS

| | | | | |
|---|---|---|---|---|
| 7,046,779 | B2* | 5/2006 | Hesse | H04N 7/152 379/202.01 |
| 9,714,037 | B2* | 7/2017 | DeRuyck | G06V 20/597 |
| 10,795,183 | B1* | 10/2020 | Lewis | A61F 9/045 |

(Continued)

*Primary Examiner* — Tauqir Hussain
(74) *Attorney, Agent, or Firm* — Westborough IP Group, LLC

(57) ABSTRACT

Handling unacceptable behavior by a user making a video recording includes detecting the unacceptable behavior by the user while the user is making the recording by applying machine learning to data about the user received from capturing devices. A predetermined list of bad habits is used and recognition accuracy is used for an episode of the unacceptable behavior. The episode is marked in the video recording and added to a list of bad habit episodes for the video recording if recognition accuracy of the episode is high. The user is prompted for confirmation of the episode if the recognition accuracy of the episode is low. The episode is marked in the video recording and added to the list of bad habit episodes if the recognition accuracy of the episode is low and the user confirms the episode. The machine learning may include an initial training phase.

25 Claims, 13 Drawing Sheets

(51) Int. Cl.
*G06V 40/20* (2022.01)
*G08B 3/10* (2006.01)

(56) References Cited

U.S. PATENT DOCUMENTS

| | | | | |
|---|---|---|---|---|
| 11,418,757 | B1* | 8/2022 | Parampottil | H04N 7/147 |
| 2008/0068447 | A1* | 3/2008 | Mattila | H04N 7/15 |
| | | | | 348/E7.083 |
| 2009/0079816 | A1* | 3/2009 | Qvarfordt | G06V 40/20 |
| | | | | 348/14.16 |
| 2016/0046298 | A1* | 2/2016 | DeRuyck | G06V 20/597 |
| | | | | 340/576 |
| 2016/0234268 | A1* | 8/2016 | Ouyang | H04L 67/54 |
| 2016/0330084 | A1* | 11/2016 | Hunter | H04L 47/2425 |
| 2017/0330042 | A1* | 11/2017 | Vaziri | H04N 5/332 |
| 2018/0123629 | A1* | 5/2018 | Wetzig | G08B 21/0423 |
| 2018/0307320 | A1* | 10/2018 | Ananthapur Bache | |
| | | | | G06F 3/04845 |
| 2020/0159487 | A1* | 5/2020 | Dawson | G06F 3/16 |
| 2020/0245900 | A1* | 8/2020 | Douglas | A61B 5/150809 |
| 2021/0035399 | A1* | 2/2021 | Dai | G06K 7/1417 |
| 2021/0056968 | A1* | 2/2021 | Shreeshreemal | G10L 15/22 |
| 2021/0295728 | A1* | 9/2021 | Sarrafzadeh | G10L 15/083 |
| 2022/0116736 | A1* | 4/2022 | Williams | G06Q 20/3224 |
| 2022/0203996 | A1* | 6/2022 | Katz | G06V 10/82 |
| 2022/0253126 | A1* | 8/2022 | Holland | G06F 3/011 |
| 2022/0280098 | A1* | 9/2022 | Hao | A61B 5/4803 |
| 2022/0284530 | A1* | 9/2022 | Bucciarelli | H04W 4/00 |

* cited by examiner

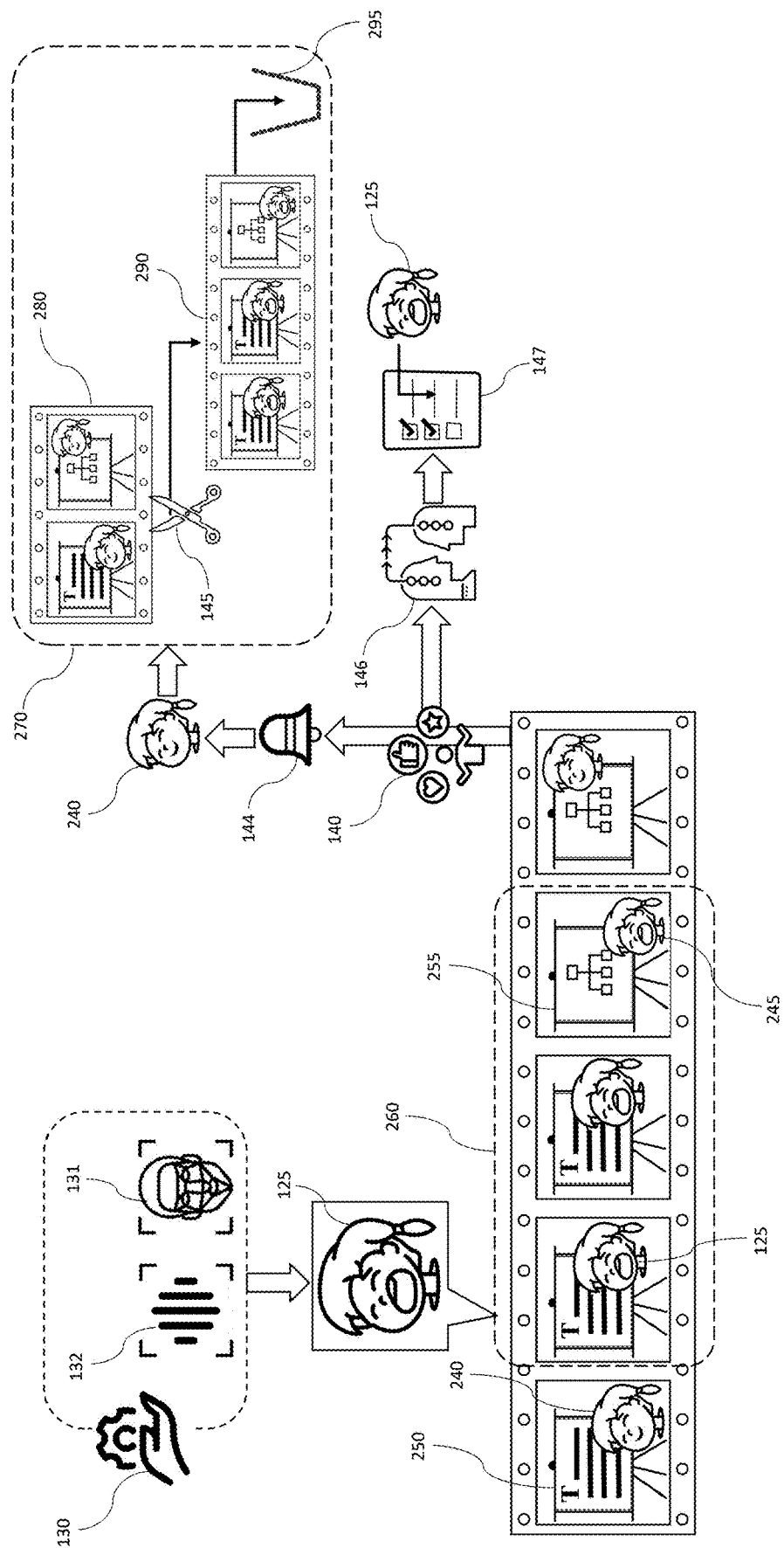

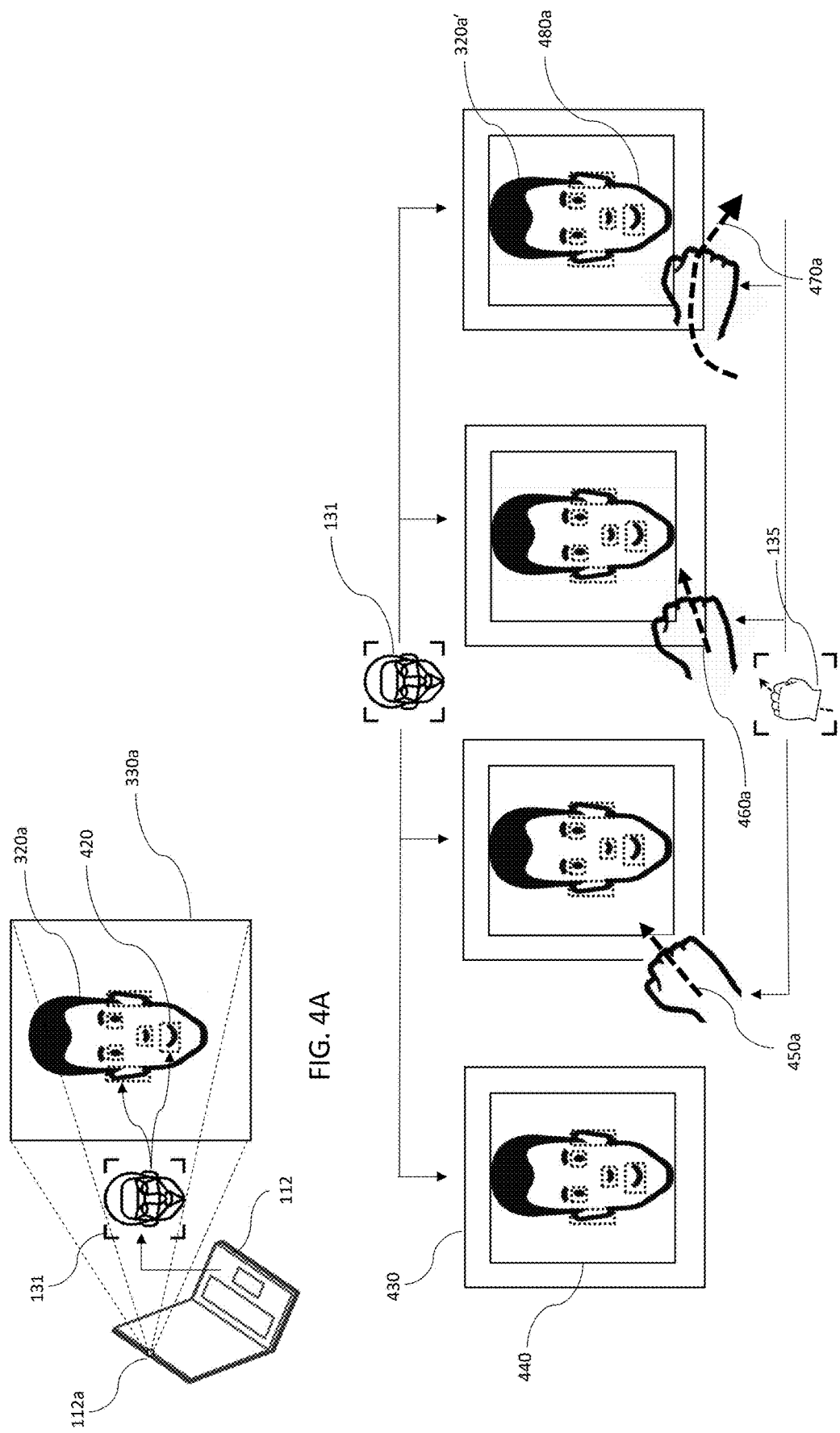

RECOGNIZING AND MITIGATING DISPLAYS OF UNACCEPTABLE AND UNHEALTHY BEHAVIOR IN IMMERSIVE VIDEO RECORDINGS

CROSS-REFERENCE TO RELATED APPLICATIONS

This application is a continuation-in-part of U.S. patent application Ser. No. 18/122,749, filed on Mar. 17, 2023, and entitled "RECOGNIZING AND MITIGATING DISPLAYS OF UNACCEPTABLE AND UNHEALTHY BEHAVIOR BY PARTICIPANTS OF ONLINE VIDEO MEETINGS", which is a continuation of U.S. patent application Ser. No. 17/226,315, filed on Apr. 9, 2021, and entitled "RECOGNIZING AND MITIGATING DISPLAYS OF UNACCEPTABLE AND UNHEALTHY BEHAVIOR BY PARTICIPANTS OF ONLINE VIDEO MEETINGS", which claims priority to U.S. Prov. App. No. 63/008,769, filed on Apr. 12, 2020, and entitled "TRACKING HAND MOVEMENTS AND GENERATING ALARMS TO PREVENT USERS FROM TOUCHING THEIR FACES", all of which are incorporated herein by reference.

TECHNICAL FIELD

This application is directed to the field of facial, gesture, hand movement and gaze recognition, and more particularly to the field of recognizing and mitigating displays of unacceptable and unhealthy behavioral habits by authors of immersive video recordings.

BACKGROUND OF THE INVENTION

Video content has emerged as a dominant productivity, educational and entertainment medium for contemporary businesses and homes. An average Internet user spends about 100 minutes per day watching online video content. 95% of Internet users watch product and service illustrations in the form of explainer videos; consumer polls show that 84% of the watchers made purchase decision after learning product and service features from such videos. It is estimated that viewers can retain about 95% of the information found in a video content compared to just 10% information after consuming textual information.

According to market research, the size of the global enterprise video market will grow from $16.4 billion in 2021 to $52.9 billion by 2030 at CAGR 13.8% (11.3% in the US). Over 60% of this market represents asynchronous, pre-recorded content, and almost 40% corresponds to synchronous video conferencing. Experts underscore two major internal factors driving an accelerated growth of the enterprise video market: the need to improve operational efficiency and employee productivity, and the need to connect the remote workforce distributed through physical offices, homes and on the go in many geographical locations, which reflects the emerging distributed and hybrid work paradigm for the global workforce.

Business applications that benefit from the growing use of video content include professional training, education, e-commerce, marketing, product development and support, business communications and presentations, hiring and onboarding, consulting, etc. Market estimates put the video content for marketing and sales in Banking, Financial Services, and Insurance as the largest segment. The fastest overall growth rate is also expected in the subsegment of market and client engagement of the marketing and sales segment.

Notwithstanding the sizable efficiency gains and numerous benefits from the proliferation of video content, there is a growing list of difficulties and challenges accompanying the broadening use of video solutions, such as inadequate equipment, incompatible software applications, corporate firewalls limiting user access, low network bandwidth, insufficient scalability, etc. The above issues are aggravated by the quickly growing viewer audience and diversifying device base, which includes connected mobile devices, such as smartphone and tablets working on multiple platforms, coming in many form factors, and therefore dictating different preferences for the evolving spectrum of geometries of video frames.

The inventory of technical and organizational challenges for the creation and pervasive distribution of video content has been lately augmented with new issues caused by the expanding possibilities and features of the video medium-specifically, with the increased use of Augmented Reality (AR) and immersive features in video presentations. Market analysts have long predicted and welcomed advancements in AR and VR, representing significant opportunities for enterprise video service providers. Pioneered by mmhmm, inc., Loom, inc., and other technology players, the immersion of a presenter, captured by a front camera during a pre-recorded or interactive presentation, automatically segmented from the presenter's environment and placed in front of the presentation materials, such as a slide deck, with additional features, allowing the presenter to resize, move, and add visual effects to the presenter's image, has become an increasingly popular feature used in many thousands of asynchronous (pre-recorded) and interactive presentation videos.

SUMMARY OF THE INVENTION

An important aspect of the immersive video content is cultural and social acceptability of behavior of a presenter by viewers of the video. The acceptability concept involves multiple aspects, ranging from appearance and attire of the presenter and condition of the physical presentation environment (in case it is preferred to a virtual background) to keeping positive attitude and body language and avoiding unacceptable behavioral displays and manifestations of bad habits, such as yawning, yelling at family members or pets, cursing, blowing, or digging one's nose, turning away from the screen during presentation, etc. Such behavioral flaws may occur subconsciously so that avoiding them, especially during a lengthy video recording, may be challenging. Some of these habits may also be unhealthy or even harmful; for example, when presenters are touching their faces, there is a risk of spreading viruses and germs from fingers of the presenter to mucous membranes to cause further infections with dangerous viruses, such as Covid-19 or flu.

In spite of extensive case studies and media reports and notwithstanding the availability of hardware and software capabilities for capturing and tracking behavior of a presenter (for example, facial and gesture recognition technologies are built into all major software platforms, while eye-tracking is supported by a growing list of mobile devices), there is little practical research and assistance in detecting and mitigating unacceptable, disagreeable and/or unhealthy behavior of presenters and other authors of the pre-recorded immersive video content.

Accordingly, it is desirable to develop techniques and workflows for recognizing and mitigating unacceptable behaviors by creators of the instantly immersive video content.

According to the system described herein, handling unacceptable behavior by a user making a video recording includes detecting the unacceptable behavior by the user while the user is making the recording by applying machine learning to data about the user received from one or more capturing devices and by using a predetermined list of bad habits, determining recognition accuracy for a particular episode of the unacceptable behavior, marking the particular episode in the video recording and adding the particular episode to a list of bad habit episodes for the video recording in response to recognition accuracy of the particular episode being high, prompting the user for confirmation of the particular episode in response to the recognition accuracy of the particular episode being low, and marking the particular episode in the video recording and adding the particular episode to the list of bad habit episodes for the video recording in response to the recognition accuracy of the particular episode being low and the user confirming the particular episode. The machine learning may include an initial training phase that, prior to deployment, is used to obtain a general recognition capability for each item on the predetermined list of bad habits having a low recognition accuracy that has been confirmed by the user. The confirmation may be provided by the user and may be used to improve the recognition accuracy of the machine learning. The one or more capturing devices may include a laptop with a camera and a microphone, a mobile device, autonomous cameras, add-on cameras, headsets, regular speakers, smart watches, wristbands, smart rings, and wearable sensors, smart eyewear, heads-up displays, headbands, and smart footwear. The data about the user may include visual data, sound data, motion, proximity and chemical sensor data, heart rate, breathing rate, and/or blood pressure. The list of bad habits may include nail biting, yelling, cursing, making unacceptable gestures, digging one's nose, yawning, blowing one's nose, combing one's hair, slouching, and/or looking away from a screen. Technologies used to detect bad habits may include facial recognition, sound recognition, speech recognition, gesture recognition, and/or hand movement recognition. Yawning may be detected using a combination of the facial recognition technology, the sound recognition technology, and the gesture recognition technology. Face touching may be detected using the facial recognition technology and hand movement recognition technology. Digging one's nose may be detected using the facial recognition technology and hand movement recognition technology. At least some bad habit episodes from the list of bad habit episodes may be presented to the user. The user may delete at least one of the bad habit episodes from the video recording. A portion of the video recording corresponding to the at least one of the bad habit episodes may be re-recorded by the user. A list of identified types of bad behavior may be presented to the user with examples and recommendations. The list of identified types of bad behavior may be used for avoidance of bad behavior for future recordings. The list of identified types of bad behavior may be presented to the user as part of learning program presented to the user. The learning program may track user success in behavior improvement and repeats learning cycles as needed.

According further to the system described herein, preventing a user from touching a face of the user includes obtaining video frames of the user including the face of the user, applying facial recognition technology to the video frames to detect locations of particular portions of the face, detecting a position, shape, and trajectory of a moving hand of the user in the video frames, predicting a final position and shape of the hand based on the position, shape, and trajectory of the hand and on the locations of the specific portions of the face, and providing an alarm to the user in response to predicting that a final position of the hand will be touching the face of the user. Predicting a final position of the hand may include determining if the hand crosses an alert zone that is proximal to the face. The alarm may vary according to a predicted final shape of the hand and according to predicting that a final position of the hand will be touching a specific one of the particular portions of the face. The predicted final shape of the hand may be an open palm or open fingers.

According further to the system described herein, preventing a user from touching a face of the user includes detecting a position, shape, and trajectory of a moving hand of the user based on one or more sensors from a wearable device of the user, predicting a final position and shape of the hand based on the position, shape, and trajectory of the hand and on the locations of the specific portions of the face, and providing an alarm to the user in response to predicting a final position of the hand will be touching the face of the user. The wearable device may be a smart watch and at least one of the position, shape, and trajectory of the moving hand may be determined using sensors of the smart watch. Predicting the final position and shape of the hand may use machine learning that is adapted to the user during a training phase. The wearable device may be a smart ring and at least one of the position, shape, and trajectory of the moving hand may be determined using a proximity sensor, an accelerometer or a gyroscope of the smart ring. The wearable device may be smart glasses and at least one of the position, shape, and trajectory of the moving hand may be determined using a proximity sensor of the smart glasses.

According further to the system described herein, a non-transitory computer readable medium contains software that handles unacceptable behavior by a user making a video recording. The software includes executable code that detects the unacceptable behavior by the user while the user is making the recording by applying machine learning to data about the user received from one or more capturing devices and by using a predetermined list of bad habits, executable code that determines recognition accuracy for a particular episode of the unacceptable behavior, executable code that marks the particular episode in the video recording and adds the particular episode to a list of bad habit episodes for the video recording in response to recognition accuracy of the particular episode being high, executable code that prompts the user for confirmation of the particular episode in response to the recognition accuracy of the particular episode being low, and executable code that marks the particular episode in the video recording and adds the particular episode to the list of bad habit episodes for the video recording in response to the recognition accuracy of the particular episode being low and the user confirming the particular episode. The machine learning may include an initial training phase that, prior to deployment, is used to obtain a general recognition capability for each item on the predetermined list of bad habits having a low recognition accuracy that has been confirmed by the user. The confirmation may be provided by the user and may be used to improve the recognition accuracy of the machine learning. The one or more capturing devices may include a laptop with a camera and a microphone, a mobile device, autonomous cameras, add-on cameras, headsets, regular speakers, smart watches, wristbands, smart rings, and wearable sensors, smart eyewear, heads-up displays, headbands, and smart footwear. The data about the user may include visual data, sound data, motion, proximity and chemical sensor data, heart rate, breathing rate, and/or blood pressure. The list of bad habits may include nail biting, yelling, cursing, making unacceptable gestures, digging one's nose, yawning, blowing one's nose, combing one's hair, slouching, and/or looking away from a screen. Technologies used to detect bad habits may include facial recognition, sound recognition, speech recognition, gesture recognition, and/or hand movement recognition. Yawning may be detected using a combination of the facial recognition technology, the sound recognition technology, and the gesture recognition technology. Face touching may be detected using the facial recognition technology and hand movement recognition technology. Digging one's nose may be detected using the facial recognition technology and hand movement recognition technology. At least some bad habit episodes from the list of bad habit episodes may be presented to the user. The user may delete at least one of the bad habit episodes from the video recording. A portion of the video recording corresponding to the at least one of the bad habit episodes may be re-recorded by the user. A list of identified types of bad behavior may be presented to the user with examples and recommendations. The list of identified types of bad behavior may be used for avoidance of bad behavior for future recordings. The list of identified types of bad behavior may be presented to the user as part of learning program presented to the user. The learning program may track user success in behavior improvement and repeats learning cycles as needed.

The proposed system offers a mechanism for recognizing and mitigating displays of unacceptable behavior by a user who is a presenter of an immersive video presentation recorded by the user; the system prevents the user from touching the face of the user by identifying a pool of capturing devices and techniques capable of continuous monitoring of the user; assembling a recognition and tracking technology stack for detecting manifestations of unacceptable behaviors or attempts by the user to touch the face of the user; continuously training recognition and tracking technologies to improve recognition speed and accuracy; warning and notifying the user about manifestations and attempts of unacceptable and unhealthy behavior, and creating a list of unacceptable behaviors by the user; offering the user a learning course with recommendations on avoiding unacceptable behavior, and presenting the user with episodes of unacceptable behavior at the end of each recorded presentation, allowing the user to edit the presentation and eliminate the episodes of unacceptable behavior. System Functioning is Explained in More Detail Below as Follows:

1. Identifying capturing devices. The most ubiquitous device capturing audio-video stream of a presentation of a user may be a notebook computer of the user with a built-in video camera and a microphone, typically running a major operating system and standalone or browser-based video recording and editing software and possessing a wireless internet connection with sufficient bandwidth. Some advanced users may enjoy a more sophisticated or even a professional audio-video setup with multiple monitors, cameras, microphones, headsets, smart speakers, sound enhancing and lighting equipment, green screens, etc. Other users may create video recordings from smartphones and tablets or use smartphones, tablets, and/or other mobile devices for content presentations and processing special types of input; in addition to capturing audio-video stream, user devices may track user movement, hand movement, gaze direction, etc. Finally, wearable devices and sensors, such as smart watches, wristbands and headbands, smart eyeglasses, smart rings, wearable medical sensors (including chemical sensors), etc. are capable of capturing and monitoring user movement, vital signs (pulse rate, temperature, respiration rate, blood pressure) and other physiological parameters, controlled and processed directly by wearable devices, by connected mobile devices, such as smartphones, or by cloud services and used in assessing emotional and physical conditions of users.

2. Compiling list of bad habits. Unacceptable behavioral traits and acts may be conditionally categorized into verbal and non-verbal acts, static and dynamic acts, and further into facial expressions, gestures, postural positions, verbal anomalies, or audibly offensive noises, and combined types. Depending on various cultural, national, social and presentation specific factors, the register of unacceptable behavior may include, for example, the following acts: yelling, yawning, blowing one's nose, touching one's face with fingers (especially rubbing eyes, digging one's nose or putting fingers in the mouth), nail-biting, itching, turning away from screen (for example, to look at a smartphone), combing hair in public, grimacing, displaying indecent gestures, cursing aloud, displaying bad posture, etc.

3. Assembling recognition and tracking technology stack. Many recognition and other technologies facilitating detection of unacceptable behaviors are already available to developers on mobile and desktop computers either with key operating systems, such as MacOS, iOS, Windows, and Android, or with add-on software packages. The basic inventory of technologies may include facial, gesture, hand movement, speech, sound, posture, sentiment, and general image recognition, and eye-tracking for detection of gaze direction (gaze estimation). Depending on a user specific configuration of capturing devices (as explained elsewhere herein), recognition technologies may use different sets of features and parameters. For example, detecting an emotional state of a user may be based strictly on image-based facial recognition if the user is captured only on a notebook camera; alternatively, detecting an emotional state of a user may also use vital signs such as heart and breathing rate and changes in the blood pressure if the user is wearing a smart watch, a wristband, or medical sensors. Analogously, user hand movement may be captured directly through a video stream, and recognition accuracy may be further improved if the user wears a smart ring with a motion sensor on a finger of the moving hand.

The system may combine several technologies to recognize and track unacceptable behaviors. For example, an act of yawning may require a combination of facial recognition technology, gesture recognition technology (a mouth covering gesture representative of a portion of users) and a sound recognition technology (a characteristic yawning sound).

Table 1 exemplifies combinations of technologies used for recognition and tracking of certain acts of bad habits.

TABLE 1

Examples of combined technologies for recognizing displays of bad habits

| Bad habit | Technology 1 Name | Technology 1 Application | Technology 2 Name | Technology 2 Application | Technology 3 Name | Technology 3 Application |
|---|---|---|---|---|---|---|
| Yawning | Facial recognition | Opening mouth | Sound recognition | Yawning sound | Gesture recognition | Covering mouth |
| Touching face | Facial recognition | Adding hotspots (nose, mouth, eyes) | Hand movement recognition | Estimating final finger position | | |
| Digging nose | Facial recognition | Adding nose hotspot | Hand movement recognition | Estimating final finger position | | |

4. Machine learning. The process of training recognition algorithms via machine learning (ML) to obtain and improve the performance of recognition algorithms for individual users may include several phases:
   (i) An initial ML phase may use supervised or unsupervised learning with a large training set collected from multiple users and optionally supplied with the truth info (in a supervised option) to obtain a general recognition capability for each item on the list of bad habits (see above on combinations of recognition technologies required for the reliable recognition)
   (ii) A next phase tests results of the previous phase for an individual user and assesses recognition accuracy prior to real-life deployment.
   (iii) At a next phase, if the recognition accuracy is insufficient, additional training material is collected for the user and an additional ML phase is conducted. Note that potential updates may also include new features extracted for a particular user, along with a combined classifier.
   (iv) At a next phase, collection of training material may be continued during deployment, where the system provides periodic retraining of recognition algorithms aimed at improving recognition accuracy and speed.

5. Analytics and predictive behaviors. Behavioral analytics for each video recording made by a user, including episodes of unacceptable behavior with recorded data fragments may be stored, reviewed by the user, augmented with additional user lifestyle and activity data and processed to identify routines and predictive violations of behavioral norms by the user, provide additional automatic training and user learning materials. For example, if a user has a predisposition to repetitive unstoppable yawning by the end of a tiring recording session, the system may recommend the user to interrupt the recording after the second yawn.

6. Mitigation of unacceptable behaviors. Once an adequate technology stack has proven an ability to detect and track unacceptable user behavior during video recording in combination with an available pool of capturing devices, the system may provide different ways to mitigate such behaviors via alarms, notifications, recommendations, user learning, and editing opportunities. Some of the scenarios for such mitigation may be as follows:
   (a) At an early stage of the system functioning when recognition accuracy for unacceptable behaviors may not have reached high levels (i.e., the recognition accuracy is low), the system may warn the user about each episode of unacceptable behavior recognized with insufficient confidence, sounding or visualizing an alarm, and may supplement the alarm with a brief notification, displaying a type of the detected behavior and asking for a one-click confirmation that the behavior has been detected correctly (if the user does not pay attention to a notification, the notification goes away with a short timeout and without a determination of the true/false recognition result). User responses may be used to improve recognition accuracy by adding such episodes to training materials with user-defined truth information, and periodically performing additional sessions of machine learning.
   (b) At a later stage of system functioning when recognition accuracy has improved so that recognition accuracy is high, the system may mark all episodes of unacceptable behavior occurring during a particular video recording of a presentation by the user and utilize the episodes for several purposes:
      i. Incrementally compile the list of unacceptable behaviors by the user, which may be added to the system analytics database, periodically shared with the user, and employed for additional automatic training and for user learning.
      ii. Deliver the detected episodes of unacceptable behavior to the user at the end of the current immersive video recording. The user may then improve the quality of the recently recorded asynchronous video by deleting the defective episodes and re-recording portions of the video presentation.

7. User Learning. Upon collecting a sufficient volume of materials about unacceptable behavior patterns of a user, the system may compile a learning program and conduct the learning program in one-time or incremental cycles with the goal to improve user behavior and increase the efficiency of video recording by cutting down processing time by eliminating or cutting down the bad behavior episodes. During a learning cycle, the user may be familiarized with the list of unacceptable behaviors, characteristic manifestations (recorded episodes), and recommendations on behavioral improvements. Subsequently, the system may track user success in behavior improvement and repeat learning cycles as needed, including upon collection of additional types of the bad behavior.

8. Preventing users from touching their faces. This feature may be available both in the video recording environment and during a regular user work and personal life.

The system tracks user hand movements and position relative to the face of the user by employing facial and hand movement recognition (technology stack) on desktop and notebook devices with front-facing cameras, as well as various types of sensors, including proximity sensors and accelerometers on smartphones and wearable devices (the capturing device pool). Dynamic risk estimates of face touching in a potentially harmful manner may lead to the generation of sound and visual alarms of variable intensity, warning the user about a risky situation.

There are Several Scenarios Under which the Feature May Function:

A. Desktops and notebooks equipped with front-facing cameras. For users of notebooks equipped with front-facing cameras remaining in the field of view of the cameras, two software components, facial recognition, and hand movement recognition, may work in sync to track user behavior.
  a. Facial recognition identifies a face of a user in video frames captured by the front-facing camera and recognizes hotspots, representing face areas that are most sensitive to touch in terms of infection risks, such as the nose, mouth, eyes, and ear—each hotspot may become an entry point for a dangerous virus or bacteria.
  b. Hand movement recognition identifies hand presence and movement within an alert zone in each frame.
  c. The system estimates hand direction and speed and forecasts hand trajectory and the moment of touching the face.
  d. Hand status (fist, open palm), palm orientation and finger direction if fingers are pointing toward the face are recognized.
  e. The system assesses the riskiness of a particular hand configuration, i.e., the position, orientation, and direction of hand, palm, and fingers. For example, a finger directed to the face when the hand is also moving toward the face represents a risky configuration, whereas a user moving a first toward the chin of the user may be deemed a less risky configuration.
  f. By combining a previous assessment of hand trajectory and distance from the face and hand configuration, the system may decide to warn a user, for example, via a sound alarm, a visual alarm, or a combined alarm. The intensity (sound volume, brightness, blinking intensity, etc.) of the alarm may correspond to the risk degree and may increase or decrease as the hand comes closer to the face or moves away.
  g. If the system failed to prevent the user from touching the face, the system may continue to alarm the user at a maximum or close to maximum volume/intensity, depending on how much of an infection risk is assigned to the particular touch; the maximum volume may be associated with touching the face with a palm or a finger within one of a plurality of facial hotspots, explained elsewhere herein.

B. Mobile and wearable devices with proximity and motion sensors. In cases where a user has one or more wearable devices, there are many different scenarios in which relatively early detection of hand movement carrying a risk of a user touching his or her face may be possible. System functioning may depend on the type of device, available sensor assembly and whether a user moves an active hand with the wearable device or a passive hand without the device. Several scenarios are explained below.
  a. A wearable device, such as a smart watch or a smart wristband, has advanced motion sensors; a user moves an active hand. In this scenario, the system may record hand trajectory and identify closeness of the hand to the face of the user. A supercharged accelerometer may be able to identify dynamics of hand status and finger movements, which facilitates adequate risk assessment. By collecting multiple trajectories at a training phase, recording touch/no touch outcomes, and performing machine learning, the system may build a classifier, predicting an alarming situation, and apply the classifier at a subsequent usage phase to turn alarms on and off and control intensity of the alarms.
  b. A wearable device, such as smart glasses, earbuds, headset, headband, earrings, necklace, or other similar smart device may be permanently located near the face of the user and may be equipped with an RF, IR, or other proximity sensor. Proximity sensors may report the distance of a user hand (or other object) to the sensor or an event of crossing a threshold, corresponding to the NEAR and FAR states of the object. The system may alarm the user when a hand crosses the threshold or based on a pattern of changing the distance between the hand and the sensor (including possibly the velocity calculations). In this scenario, both hands may be passive, and the user may not have a wearable device. When the user has both a wearable device with a proximity sensor close to the face of the user and a wristband or smart watch with motion and/or position sensors and possibly with another proximity sensor, the accuracy of risk assessment and the percentage of false positives for an alarm may both be improved. Note that the system may also need to prevent possible interference between proximity sensors on two adjacent devices.
  c. A smart ring, such as an Oura or a Motiv ring or an Amazon Echo Loop, may also include an accelerometer, a gyroscope, and a proximity sensor. The proximity of a ring-wearing finger to the face may have a better risk detection accuracy than a wearable on a wrist of the user. However, absent another wearable device, this scenario may not be able to prevent the user from touching the face of the user with a passive hand.

It should be noted that in each of the mobile scenarios B.a.-B.c., the system software may run on a smartphone of the user, communicating with sensors on wearable devices via Bluetooth, Wi-Fi, or other wireless connection. The smartphone may also be used to sound or display alarms.

BRIEF DESCRIPTION OF THE DRAWINGS

Embodiments of the system described herein will now be explained in more detail in accordance with the figures of the drawings, which are briefly described as follows.

FIGS. 2A-2B are schematic illustrations of detecting and mitigating episodes of unacceptable behavior and collecting training and user learning information during an immersive video recording, according to an embodiment of the system described herein.

FIGS. 4A-4D are schematic illustrations of dynamic facial and hand movement recognition, of trajectory and risk assessment, and of user alarm options, according to an embodiment of the system described herein.

DETAILED DESCRIPTION OF VARIOUS EMBODIMENTS

The system described herein offers a variety of mechanisms for recognizing and mitigating episodes of unacceptable behavior by a user recording an immersive video presentation and for preventing users from touching their faces.

FIGS. 1A-1D are schematic illustrations of the system architecture and components.

Figure 1A:
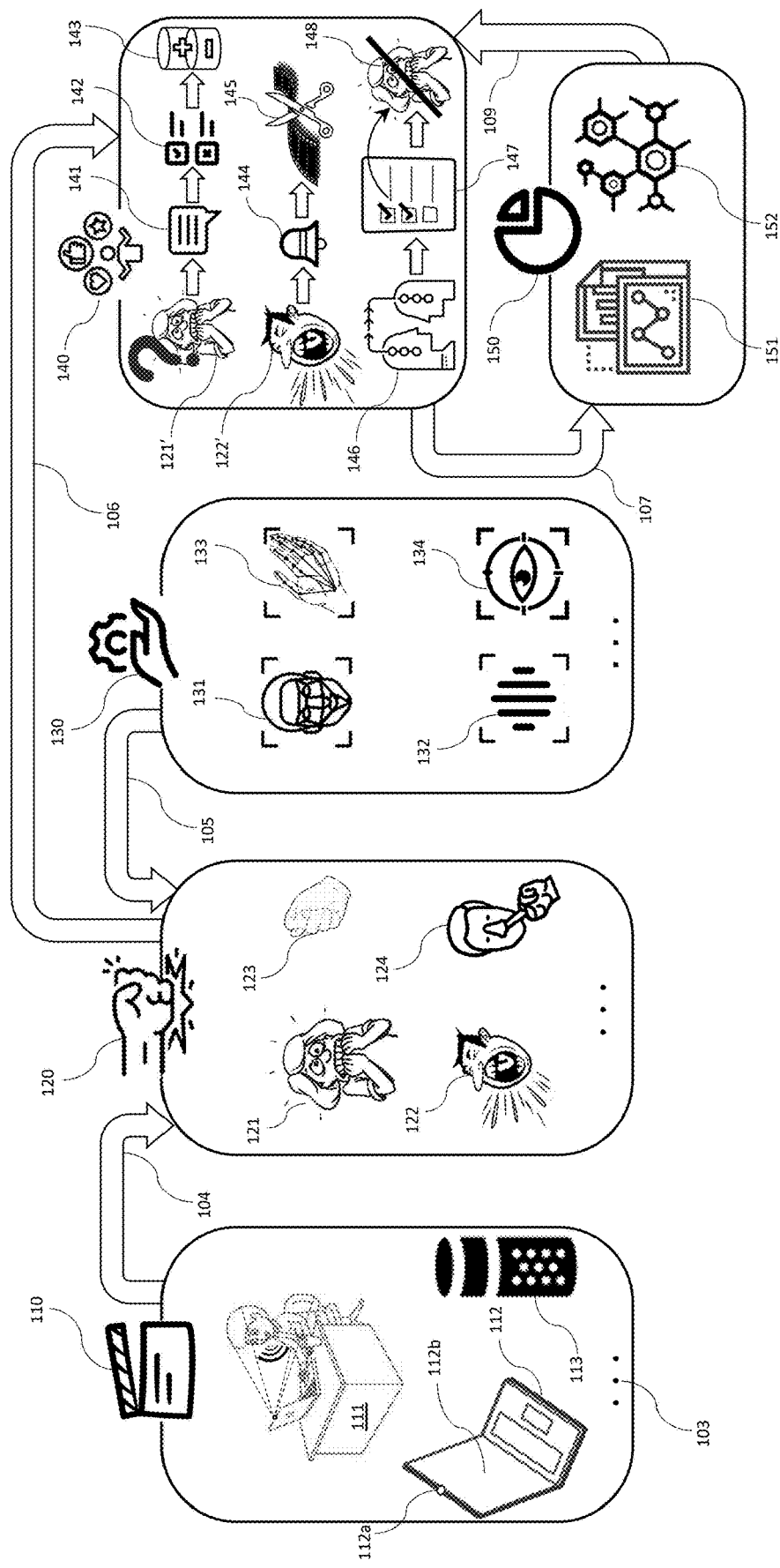
FIGS. 1A-1D are schematic illustrations of the system architecture and components, according to an embodiment of the system described herein.

FIG. 1A shows system architecture and includes five components of the system: a pool of capturing devices 110, a list of bad habits (unacceptable behaviors) 120, a technology stack 130, a feedback, mitigation, and user learning component 140, and an analytics and machine learning component 150. Each component is exemplified with several characteristic items (periods at the bottom of components, like periods 105 of the capturing devices component 110, indicate that more items are available for the component in FIGS. 1B-1D):

- A basic configuration of the capturing devices 110 for a video conference is represented by an item 111 where a user is sitting at a table with a laptop 112 and is captured by a front-facing video camera 112a of the laptop 112 while recording and immersive video presentation visualized on a screen 112b; the user may speak into a built-in microphone and listen through built-in speakers (not shown in FIG. 1A). The basic configuration may be expanded in a variety of ways, represented in FIG. 1A by a smart speaker 113 and further explained in FIG. 1B.
- A basic list of bad habits (unacceptable behaviors) 120 is illustrated by nail biting 121, yelling 122, making unacceptable gestures 123 and digging one's nose 124; further examples of bad habits are shown in FIG. 1C.
- A technology stack 130 for recognizing and tracking unacceptable behaviors is exemplified by facial recognition technology 131, sound recognition technology 132, gesture recognition technology 133 and eye-tracking with gaze estimation technology 134; more technology entities are presented in FIG. 1D.

Displays of unacceptable behaviors from the list 120 are captured by devices from the capturing devices 110, as shown by an arrow 104, recognized and tracked by technologies from the stack 130, as shown by an arrow 105, and are forwarded to the feedback, mitigation, and the user learning component 140, as shown by an arrow 106, which may take various actions as follows:

- A nail biting episode 121' is identified at an early stage of the system functioning when recognition accuracy for unacceptable behaviors may not be very high, as explained elsewhere herein (see, for example, Section 6 (a) of the Summary) and as indicated by a question mark near the pictogram of the bad habit. Accordingly, the system displays to the user a notification 141 with a confirmation request. The user may choose to confirm or reject the preliminary recognition result, as shown by a diagram 142 (the user may also ignore the notification 141). If the system receives a user answer, the nail biting episode may be added to the training database 143 with a positive or negative truth info and may be used in a subsequent cycle of machine learning.
- A yelling episode 122' is confidently recognized at a later stage; the user receives an alarm 144 and the episode of unacceptable behavior is marked within the immersive video recording and is displayed to the user at the end of video recording to allow user to edit the video using editing tools 145, by, for example, cutting out the episode 122', as explained in the Section 6 (b), ii of the Summary.
- At a learning stage 146, a list 147 of all identified types of bad habits is presented to the user with examples (sample episodes) and recommendations, aimed at avoidance of bad behaviors by the user during future recordings of immersive presentations, as symbolized by an item 148.

Data on recognition of episodes of unacceptable behavior, potentially including raw recorded video, audio, sensor and other data, user feedback, system and learning actions may be transferred from the user learning component 140 to the analytics and machine learning component 150, as shown by an arrow 107. Subsequent data processing, using portions of raw data as training materials and incremental post-recording machine learning, as well as user post-processing of episodes of unacceptable behavior are explained elsewhere herein.

Figure 1D:
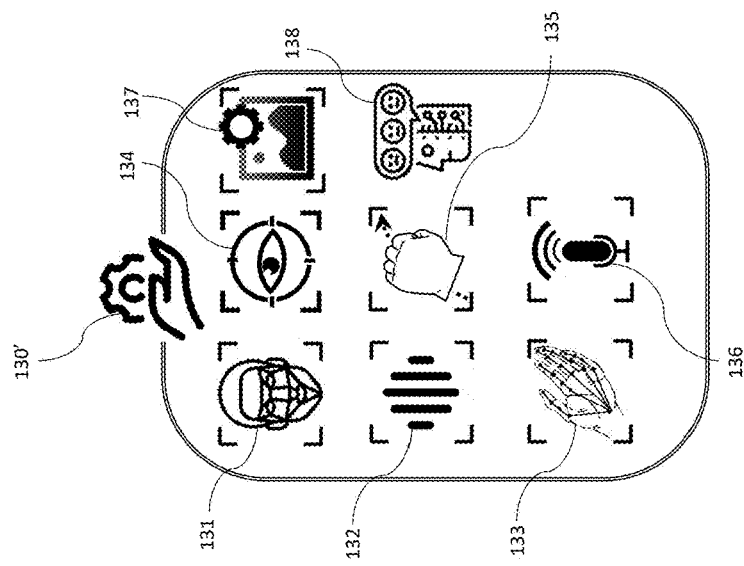
Figure 1C:
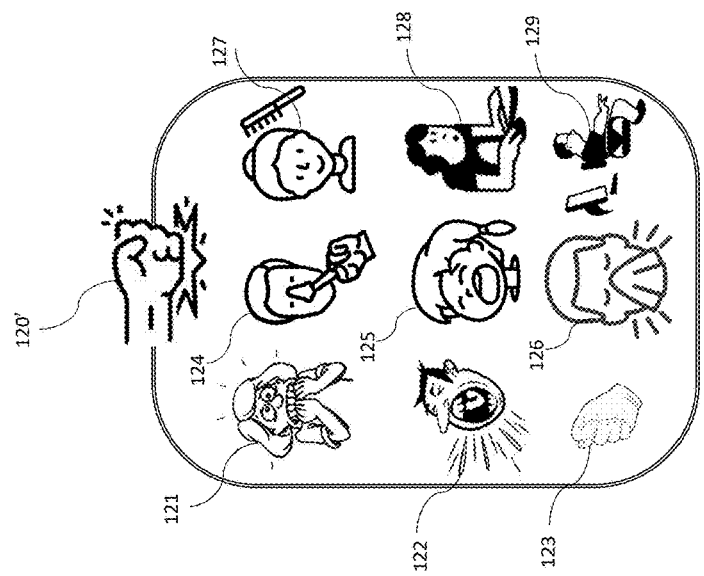
Figure 1B:
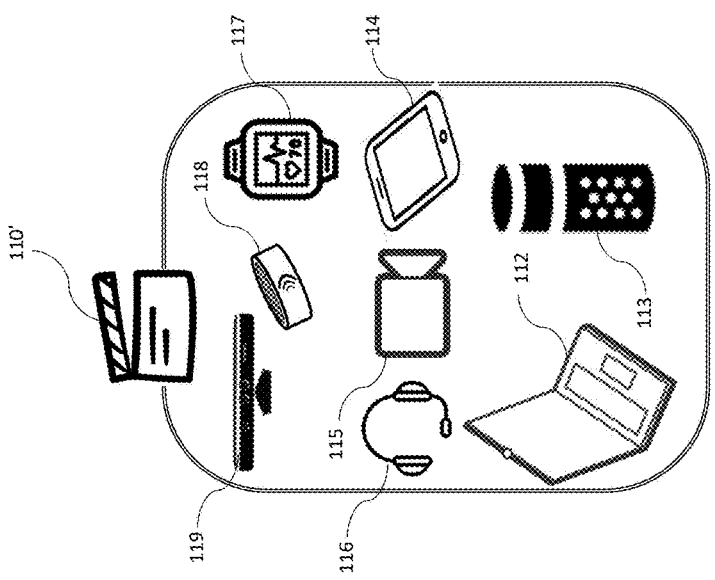

FIG. 1B shows an extended list 110' of capturing devices. In addition to the previous listing of the laptop 112 and the smart speaker 113, the extended list 110' may include mobile devices 114 (smartphones, tablets, etc.), autonomous and add-on cameras 115, headsets and regular speakers 116, smart watches and wristbands 117, smart rings 118 and wearable (as well as standalone) sensors 119. The extended list 110' may also include other types of wearable devices, such as smart eyewear, heads-up displays, headbands, smart clothing, footwear, etc.

FIG. 1C shows an extended list 120' of unacceptable behavior, adding to the bad habits 121-124 that were previously listed in FIG. 1A the following five habits: yawning 125, blowing one's nose 126, combing one's hair in public 127, slouching 128 and looking away from the screen (during an immersive video recording) 129. There are many more examples of unacceptable behaviors outside the extended list 120'.

FIG. 1D provides an extended list 130' of the technology stack 130 beyond the four technologies 131-134 exemplifier in FIG. 1A; the list 130' adds hand movement recognition 135, speech recognition 136 (different from the sound recognition technology 132), general image recognition 137 (different from the facial recognition technology 131), and sentiment recognition 138.

Figure 2A:
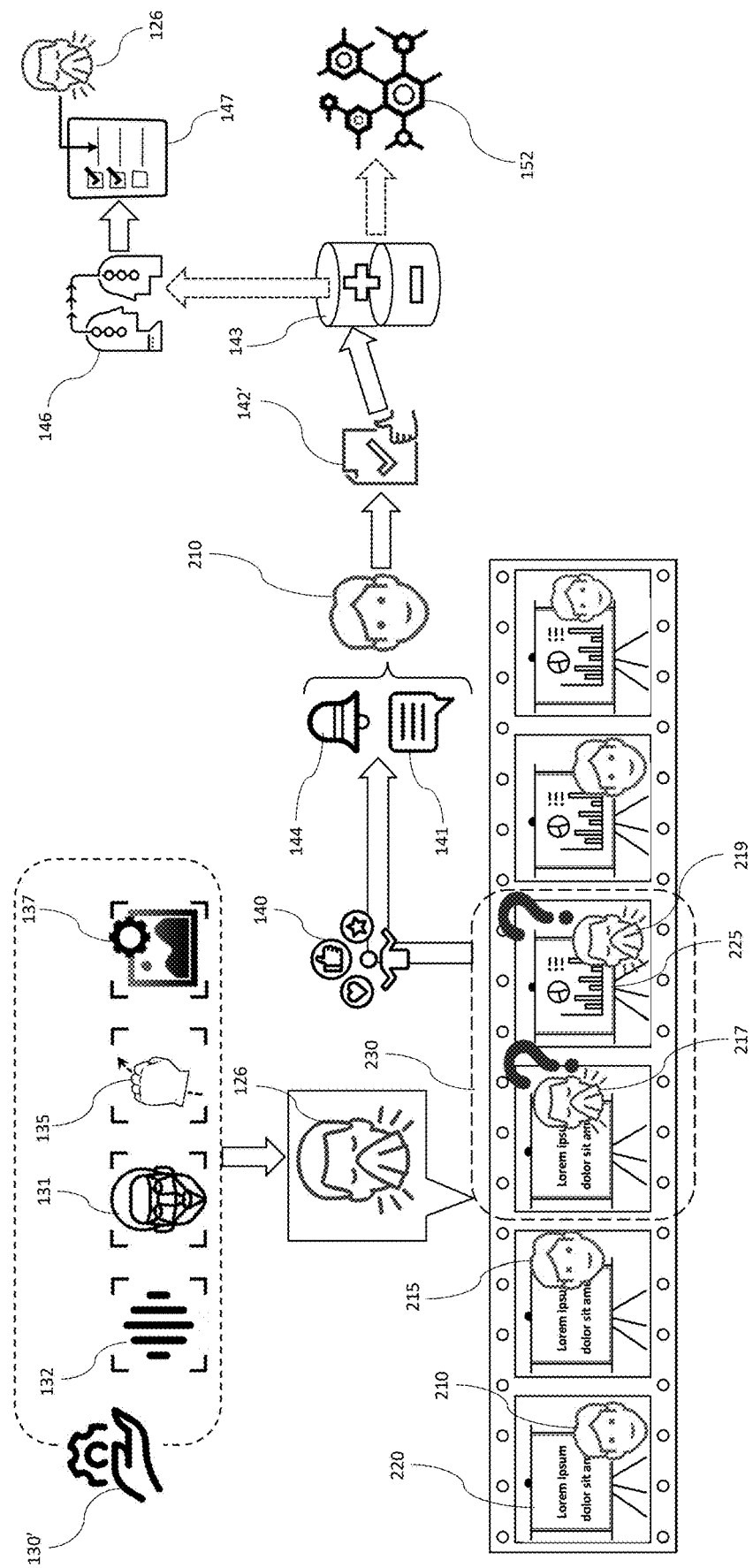

FIGS. 2A-2B are schematic illustrations of detecting and mitigating episodes of unacceptable behavior and collecting training and user learning information during an immersive video recording.

In FIG. 2A, a user 210 is recording an immersive video presentation with presentation materials (slides) 220. The user 210 may change the appearance (such as position and size) of an image 215 of the user 210. In FIG. 2A, the immersive video presentation is being recorded at an early stage of user recording history when the recognition accuracy has not reached high levels.

During the recording, four technologies from the extended technology list 130': the sound recognition technology 132, the facial recognition technology 131, the hand movement recognition 135 and the general image recognition 137 have jointly detected an episode 230 of bad behavior associated with blowing one's nose 126 when the user 210 is loudly blowing their nose. Specifically, the sound recognition technology 132 may detect a sound specific for blowing one's nose; the facial recognition technology 131 may recognize a characteristic facial expression for an act of blowing one's nose (which may differ from person to person and may require an adaptation of the facial recognition technology to specific facial expression patterns of the user 210); the hand movement recognition 135 and the general image recognition 137 may detect bringing a handkerchief to the nose of the user 210. Note that the slide 225 has changed compared with the initial slide 220 and a position and size of an image 217 of the user 210 have also changed to a different position and size of an image 219 of the user 210 within the episode 230.

Because the system is in an early stage of user recording history, recognition accuracy for blowing one's nose 126 is not necessarily high, as indicated by question marks within the frames of the episode 230. Therefore, the feedback, mitigation, and the user learning component 140 checks the validity of recognition with the user 210 by sounding or displaying the alarm 144 and displaying the notification 141, requesting for the confirmation of blowing one's nose 126. The user 210 confirms the correct recognition, as indicated by a confirmation sign 142', and the episode 230 is placed into the confirmed material area of the training database 143; the information may further be used for machine learning 152 or at the user learning stage 146, where the episode of unacceptable behavior of blowing one's nose 126 may augment the list 147 of all unacceptable behaviors of the user 210 presented to the user during learning, as explained elsewhere herein.

In FIG. 2B, a user 240 is recording an immersive video presentation with presentation materials 250. The immersive video presentation is being recorded at a mature stage of user recording history when the recognition accuracy is high and identification of unaccepted behaviors is confident. Through the course of the recording, two technologies, the sound recognition technology 132 and the facial recognition technology 131, jointly detect a bad behavior episode 260 with the yawning 125 (the gesture recognition technology shown in Table 1 in conjunction with yawning detection was not used in this example, because the user 240 did not cover the mouth of the user 240 with the hand of the user 240). Analogously to FIG. 2A, the presentation environment changes through the episode 260, as shown by two items 245, 255.

At the end of the recording, the feedback, mitigation, and the user learning component 140 delivers the obtained information on the unacceptable behavior to different destinations, as explained in Section 6 (*b*), i-ii of the Summary:

- The learning stage 146 receives information about the yawning 125 to update the list 147 of unacceptable behaviors by the user.
- The user 240 receives the alarm 144 signifying the presence of episode(s) of unacceptable behavior(s) within the video recording. The user 240 may edit the video; where editing activity 270 uses the editing tools 145 results in an improved video recording 280 with episode(s) 290 of unacceptable behaviors cut out from the original video and discarded, as shown by an item 295. (Note that the last portion of the improved video 280 may be re-recorded to provide smooth transition from the previous portion of the video.)

FIGS. 3A-3D are schematic illustrations of various face touch outcomes captured by the front-facing camera 112a of the notebook 112 (see also FIG. 1A).

Figure 3B:
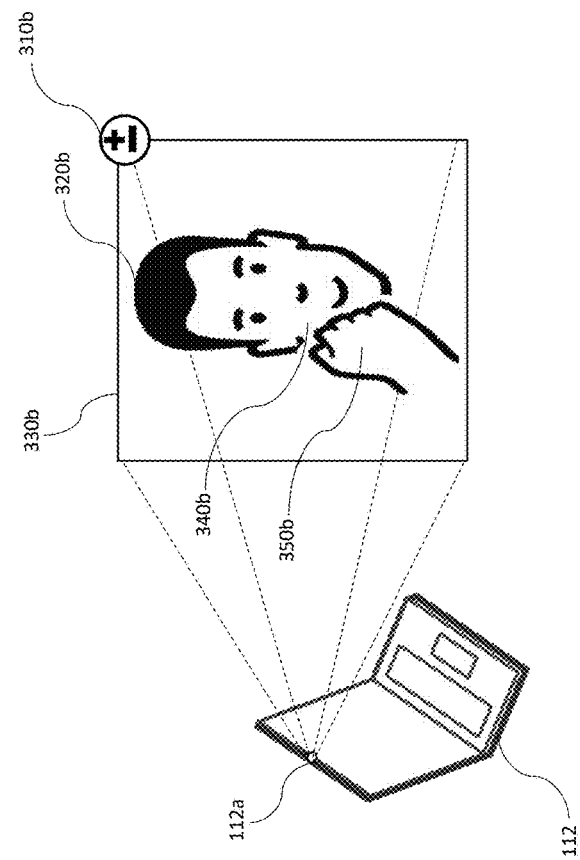
FIGS. 3A-3D are schematic illustrations of various face touch outcomes captured by a front-facing camera of a notebook, according to an embodiment of the system described herein.
Figure 3A:
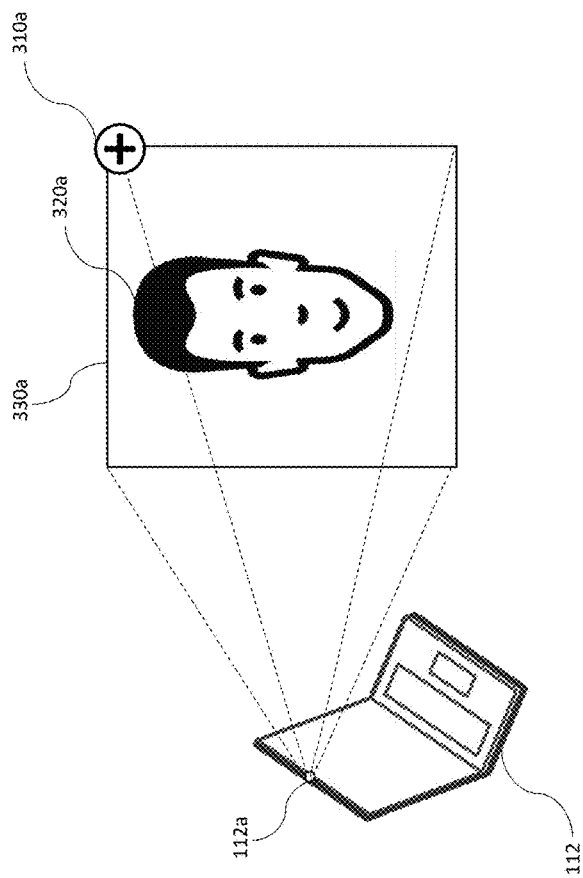

In FIG. 3A, an outcome 310a is favorable: hand(s) of a user 320a is (are) not detected in a video frame 330a.

In FIG. 3B, an outcome 310b is, generally speaking, unfavorable: a frame 330b shows a user 320b touching a cheek 340b with a first 350b. However, the touch illustrated in FIG. 3B causes less issue with transmitting germs or viruses, so the outcome 310b is marked as a moderate outcome.

Figure 3D:
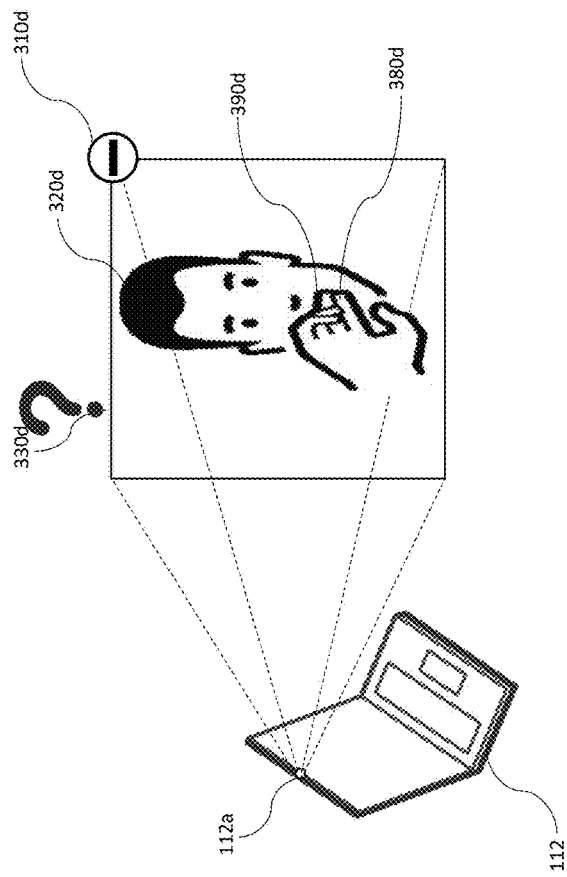
Figure 3C:
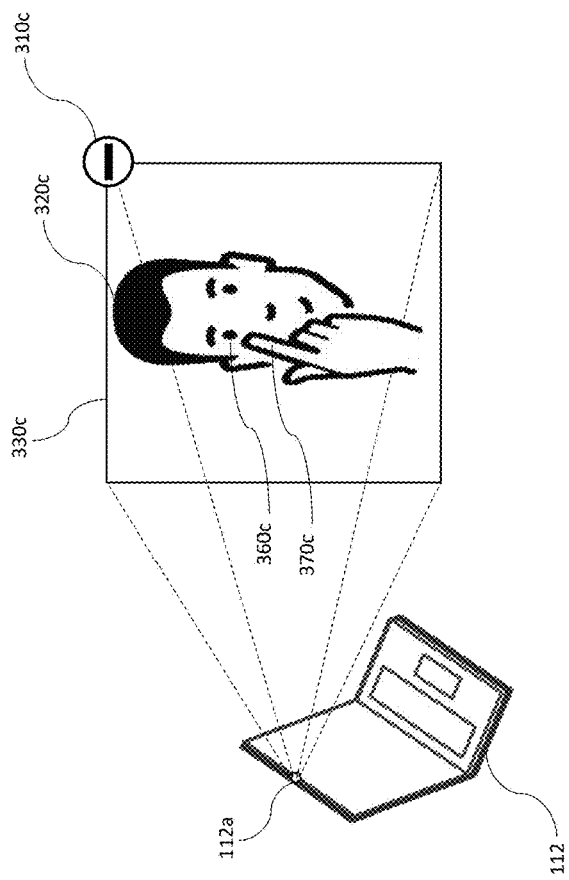

Both outcomes 310c, 310d in FIGS. 3C, 3D appear highly unfavorable and are marked as such: in FIG. 3C, a video frame 330c shows a user 320c touching an eye 360c with a finger 370c, while in FIG. 3D a video frame 330d displays a user 320d putting fingers 380d into a mouth 390d of the user 320d.

FIGS. 4A-4D are schematic illustrations of dynamic facial and hand movement recognition, of trajectory and risk assessment, and of user alarm options.

FIG. 4A shows a general layout and usage of facial recognition. The camera 112a of the notebook 112 captures a series of video frames 330a; for each frame, the facial recognition technology 131 identifies a face 320a and identifies positions of several hotspots, or touch risk zones 420 on the face 320a, typically corresponding to mouth, nose, eyes, and ears.

FIG. 4B illustrates functioning of dynamic facial and hand movement recognition in a secure situation with no alarms. Usage of the facial recognition technology 131 is explained in conjunction with the FIG. 4A. Features of the hand movement recognition technology 135 (see FIG. 1 for item enumeration) may include recognizing a dynamically changing shape of a moving hand (fist, palm, fingers), a predominant direction and speed of the moving hand, estimating a trajectory of the moving hand, etc. The system may reserve an alert zone (also called a capture zone) 440 within a video frame 430; the alert zone 440 is proximal to a facial image 320a' of a user. When an image of a hand of the user is detected in the capture zone 440, the hand movement recognition technology 135 estimates a current direction 450a of the hand and estimates a state and palm orientation 460a of the hand. Note that FIG. 4B illustrates a moving first of the user. The hand movement recognition technology 135 also estimates a trajectory of a central axis 470a of the moving hand, which in FIG. 4B does not cross an alert zone and accordingly does not cause an alarm, so a current user status 480a is considered safe.

Figure 4C:
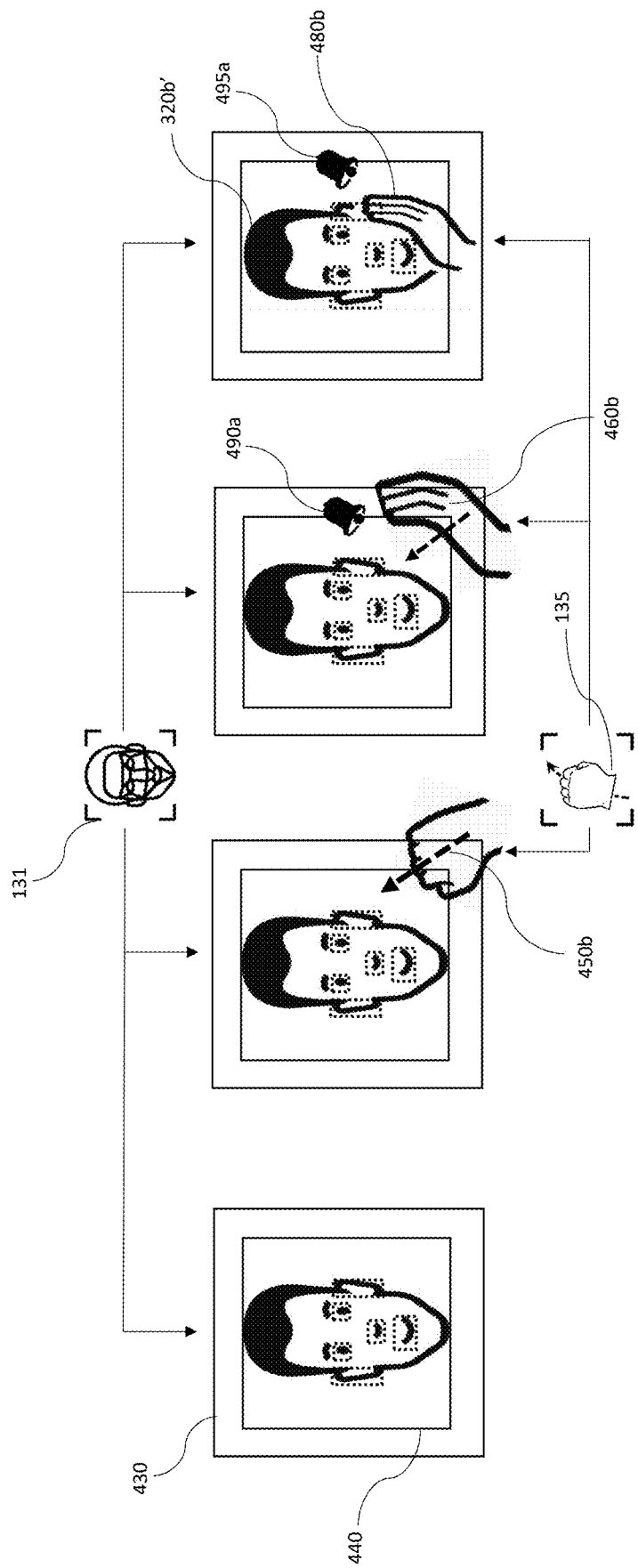

FIG. 4C illustrates a functioning of dynamic facial and hand movement recognition in a situation with a minor face touching alarm. The capture zone 440 plays the same roles as in FIG. 4B; the facial recognition technology 131 and the hand movement recognition technology 135 also function similarly but are applied to a different situation. Once a hand of a user 320b' is detected in the capture zone 440, the hand movement recognition technology 135 estimates a direction 450b of the hand and then estimates a shape and then a palm orientation of the hand. A direction and speed 460b are estimated, which causes a prediction that an open palm is moving toward a face of the user 320b' and will soon cross the alert zone 440 and touch the face. The prediction activates the mitigation system, which sounds or displays a minor alert 490a, reflecting an assessment by the mitigation system that a final position of the palm touching the face of the user is relatively safe from the hygienic standpoint. As the palm touches the face, the alert may be modified to a different tone 495a, staying a minor alert, and corresponding to an assigned user status 480b.

Figure 4D:
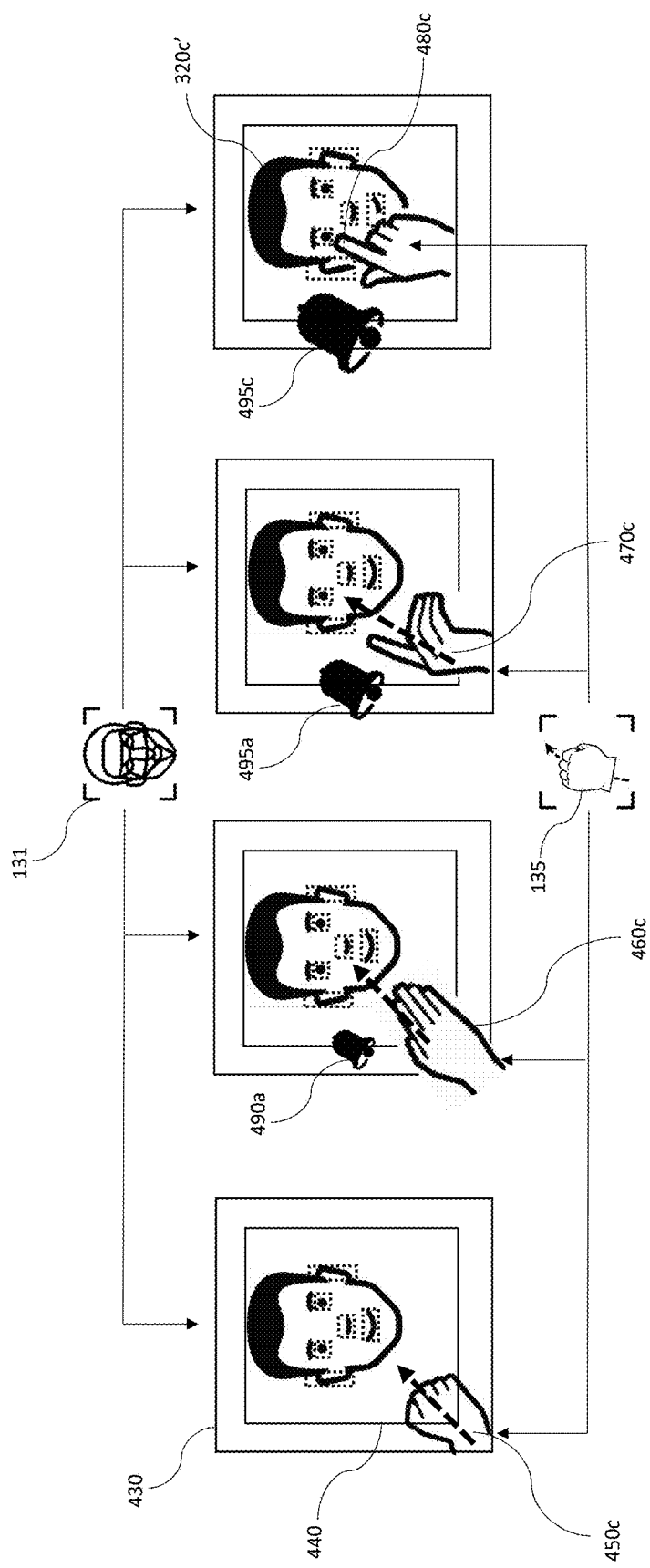

FIG. 4D illustrates functioning of dynamic facial and hand movement recognition in a situation with a major face touching alarm. The roles of the capture zone 440 and of the facial recognition technology 131 and the hand movement recognition technology 135 are the same as in FIGS. 4B-4C. As previously, once a hand of a user 320c' is captured in a video frame, the hand movement recognition technology 135 assesses a direction 450c of the hand; shortly after, the user moves open fingers in a direction of the face of the user 320c', as shown by a pictogram 460c; the configuration shown in FIG. 4D is considered potentially the most harmful; based on an assessment 460c and an extrapolation of hand trajectory, the mitigation component immediately activates a low-volume alarm 490a. A next assessment 470c provided by the hand movement recognition system 135 confirms and further enhances the previous assessment, because a finger of the user 320c' is well within an alert zone and approaches a hotspot (a touch risk zone provided by the facial recognition technology 131, as explained in conjunction with FIG. 4A) associated with an eye of the user 320c'. In response to the latter assessment, the alarm is elevated and upgraded to a state 495a. Subsequently, the user touches an eye with a finger, a status 480c is determined as dangerous and the alarm is set at a maximum level 495c.

Figure 5:
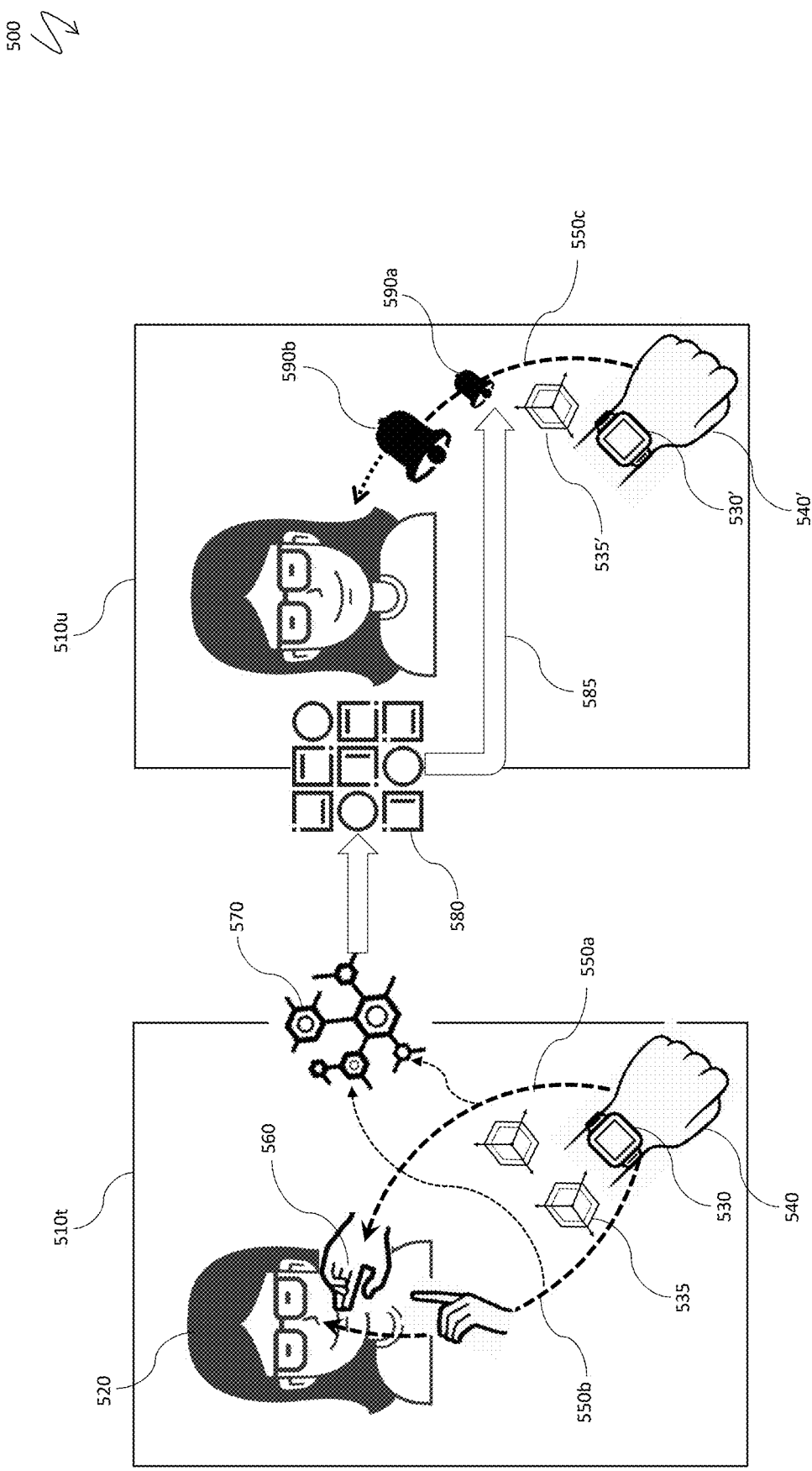
FIG. 5 is a schematic illustration of a face touch identification technology for mobile users with a smart watch, according to an embodiment of the system described herein.

FIG. 5 is a schematic illustration 500 of a face touch identification technology for mobile users with a smart watch. Technology adaptation to a particular user may include a training (machine learning) phase 510t for a user 520, an owner of a smart watch (or a smart wristband) 530 attached to a hand 540 of the user 520. An accelerometer or other movement sensor (or multiple sensors) 535 may capture trajectories and parameters (speed, rotation) of user hand movements 550a, 550b that may occasionally cause undesired events 560 corresponding to the user touching their face. Fragments of such trajectories may be used as a training material for a machine learning component 570, which may eventually produce a reliable classifier 580 for a usage phase 510u whereby fragments of trajectories 550c, obtained through measurements by sensor(s) 535' of movements of a hand 540' of an active user with an attached smart watch 530', are converted into feature vectors (feature construction is established at the training phase) and sent to the classifier 580 used for predicting whether a particular fragment of the hand trajectory poses an increased risk of the user 520 touching their face with the moving hand and may activate alarms 590a, 590b warning the user 520 about an undesirable situation. An increase in alarm volume/urgency for the alarm 590b may be associated with classification progress when the classifier 580 receives feature vectors constructed for larger fragments of the movement trajectory as the moving hand approaches the face of the user 520.

Figure 6B:
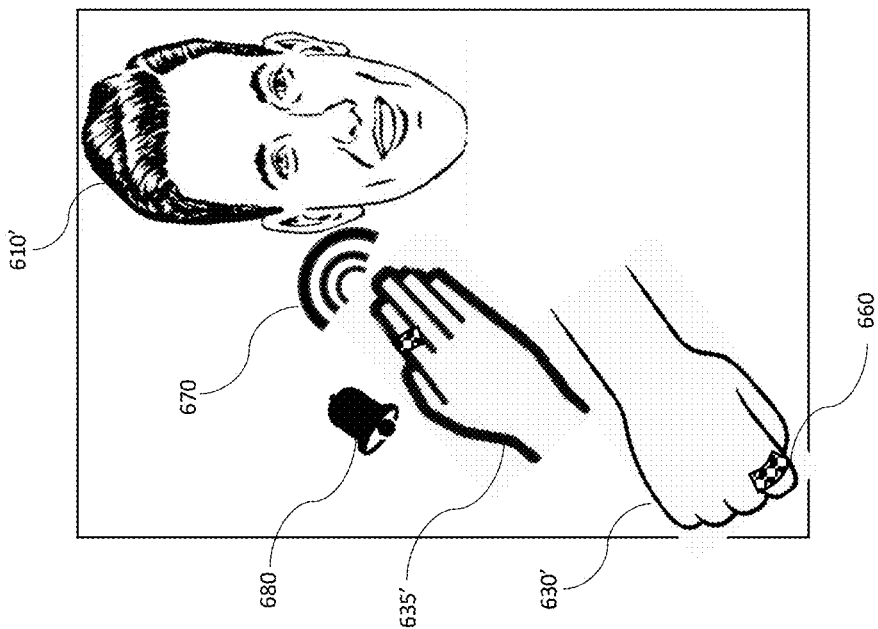
FIGS. 6A-6B are schematic illustrations of face touch alarms for mobile users with smart eyeglasses and a smart ring featuring proximity sensors, according to an embodiment of the system described herein.
Figure 6A:
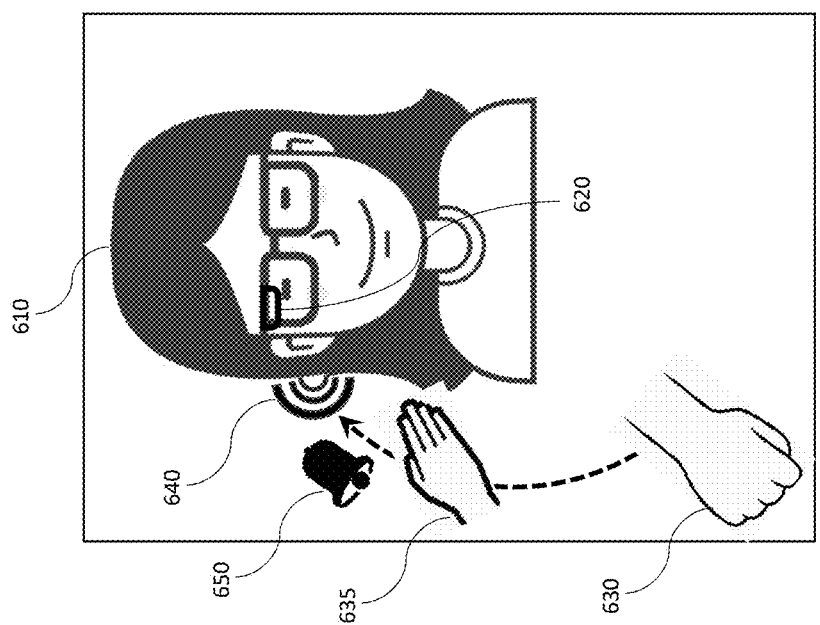

FIGS. 6A-6B are schematic illustrations of face touch alarms for mobile users with smart eyeglasses and a smart ring featuring proximity sensors.

In FIG. 6A, a user 610 with a pair of smart eyeglasses 620 supplied with a proximity sensor automatically activates an alarm 650 every time when a passive hand 630 reaches a position 635 where the hand 630 is detected by the proximity sensor, as shown by an item 640.

In FIG. 6B, a user 610' wears a smart ring 660 on a finger of an active hand 630'; the ring 660 has a built-in proximity sensor. The system automatically enables an alarm 680 every time the active hand 630' reaches a position 635' where the proximity sensor of the ring 660 detects the face of the user610', as shown by an item 670.

Figure 7:
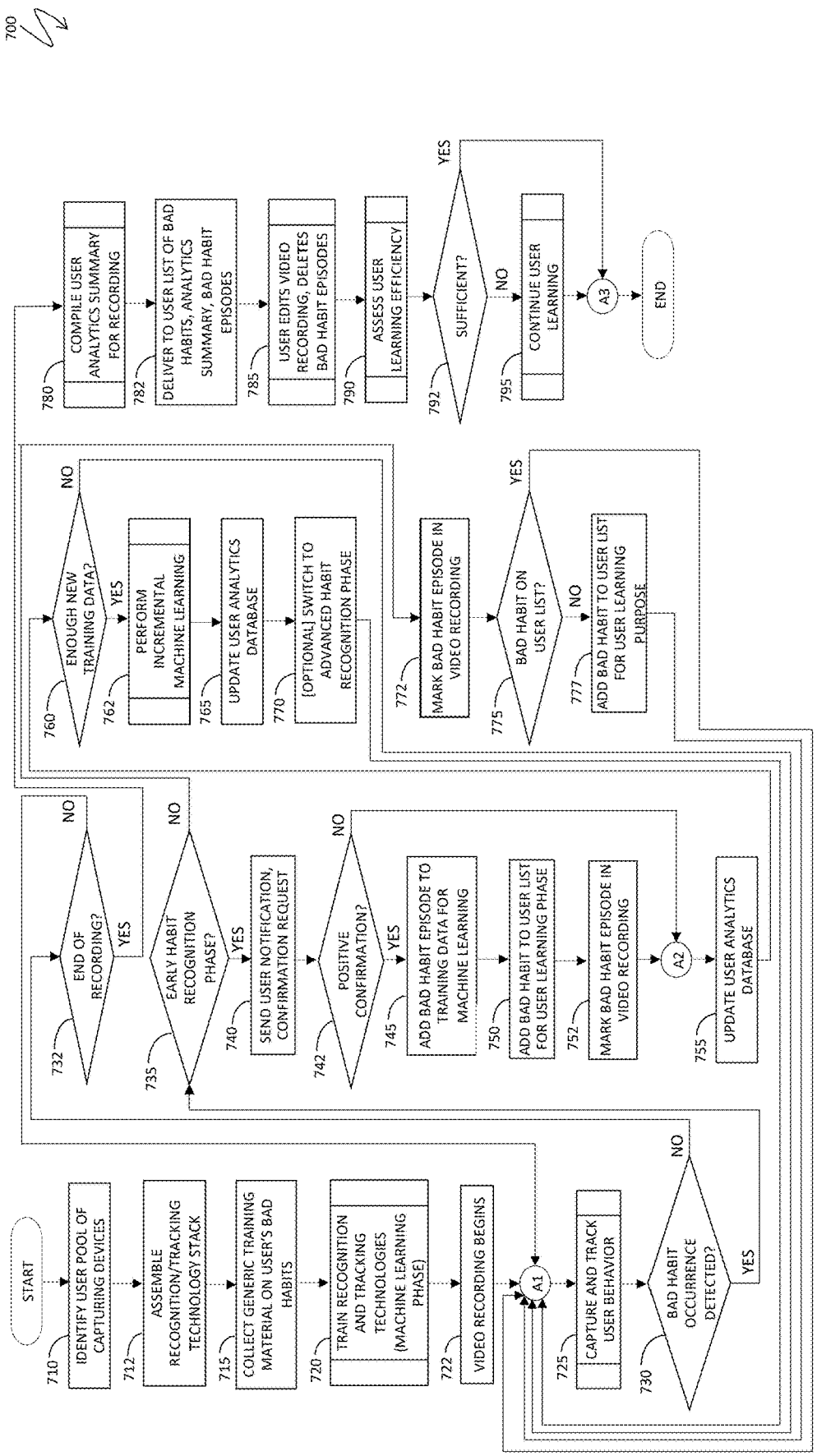
FIG. 7 is a system flow diagram illustrating system functioning in connection with detection and mitigation of unacceptable user behavior episodes and collecting training and user learning information during an immersive video recording, according to an embodiment of the system described herein.

Referring to FIG. 7, a system flow diagram 700 illustrates system functioning in connection with detection and mitigation of unacceptable user behavior episodes and collecting training and user learning information during an immersive video recording. Processing begins at a step 710, where a user pool of capturing devices is identified, as explained elsewhere herein (see, for example, FIGS. 1A, 1B and the accompanying text). After the step 710, processing proceeds to a step 712, where the system assembles recognition and tracking technology stack, corresponding to the pool of capturing devices (see FIGS. 1A, 1D and the accompanying text for details). After the step 712, processing proceeds to a step 715, where the system collects generic training material on bad habits (unacceptable behaviors) of user(s) utilizing captured data for multiple users and under different conditions. After the step 715, processing proceeds to a step 720, an initial machine learning phase, where the system trains recognition and tracking technologies, adapting the technologies to user specifics, as described elsewhere herein.

After the step 720, processing proceeds to a step 722, where an immersive video recording begins. After the step 722, processing proceeds to a step 725, where the system captures and tracks user behavior. After the step 725, processing proceeds to a test step 730, where it is determined whether a bad habit occurrence has been detected. If not, processing proceeds to a test step 732, where it is determined whether an end of recording has been reached. If not, processing proceeds to the step 725, which may be independently reached from the step 722. Otherwise, if an end of recording has been reached, processing proceeds to a step 780, where user analytics summary for the recording is compiled. After the step 780, processing proceeds to a step 782, where a list of bad habits, the analytics summary, and the bad habits episodes are delivered to the user. After the step 782, processing proceeds to a step 785, where the user edits video recording and deletes bad habit episodes, as explained elsewhere herein (see, for example, FIG. 2B and the accompanying text). After the step 785, processing proceeds to a step 790, where the system assesses user learning efficiency. After the step 790, processing proceeds to a test step 792, where it is determined whether user learning efficiency is sufficient. If so, processing is complete; otherwise, processing proceeds to a step 795, where user learning is continued. After the step 795, processing is complete.

If it is determined at the test step 730 that the bad habit occurrence is detected, processing proceeds to a test step 735, where it is determined whether the system is at an early bad habit recognition phase for the current user. If so, processing proceeds to a step 740, where the system sends the user a notification with a confirmation request, as explained elsewhere herein. After the step 740, processing proceeds to a test step 742, where it is determined whether the user returned a positive confirmation. If so, processing proceeds to a step 745, where a corresponding bad habit episode is added to the training data for machine learning. After the step 745, processing proceeds to a step 750, where the bad habit is added to the user list for user learning phase, as explained elsewhere herein (see FIG. 2A and the accompanying text). After the step 750, processing proceeds to a step 752, where the bad habit episode is marked in the video recording for subsequent processing and editing. After the step 752, processing proceeds to a step 755, where the user analytics database is updated. (Note that processing proceeds to the same step 755 from the test step 742 if it is determined that the user did not return a positive confirmation.) After the step 755, processing proceeds to a test step 760, where it is determined whether there is enough new training data. If so, processing proceeds to a step 762, where incremental machine learning based on the new training data is performed. After the step 762, processing proceeds to a step 765, where a user analytic database is updated. After the step 765, processing proceeds to the step 725, which may be independently reached from the step 722 and the test step 732. (Note that processing proceeds to the same step 725 if it is determined at the test step 760 that there is not enough new training data.)

If it is determined at the test step 735 that the system is not at an early bad habit recognition phase for the current user, processing proceeds to a step 772, where the bad habit episode is marked in the video recording and added to a list of other bad habit episodes for the current video recording (if any). After the step 772, processing proceeds to a test step 775, where it is determined whether the latest detected bad habit is on the user list. If not, processing proceeds to a step 777 where the bad habit is added to the user list for user learning purpose (see FIG. 2B and the accompanying text). After the step 777, processing proceeds to the step 725, which may be independently reached from the steps 722, 760 and the test step 732. (Note that processing proceeds to the same step 725 if it is determined at the test step 775 that there the current bad habit is already on the user list.)

Figure 8:
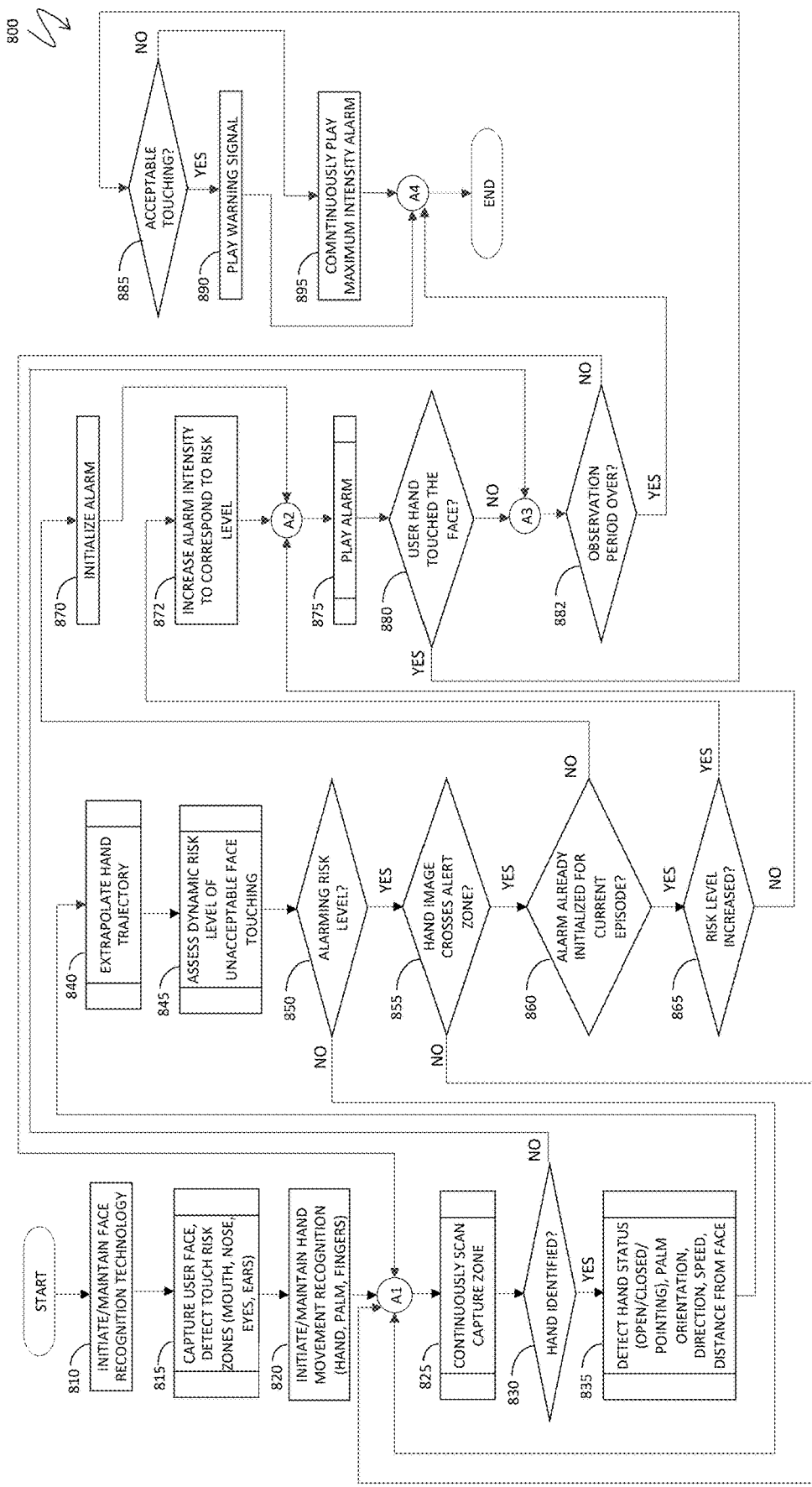
FIG. 8 is a system flow diagram illustrating system functioning in connection with preventing desktop and notebook users from touching their faces, according to an embodiment of the system described herein.

Referring to FIG. 8, a system flow diagram 800 illustrates system functioning in connection with preventing desktop and notebook users from touching their faces. Processing begins at a step 810, where the system initiates or maintains (if previously initiated) face recognition technology and software, discussed above. After the step 810, processing proceeds to a step 815, where the face recognition software captures a user face from a video stream and dynamically detects touching of risk zones (mouth, nose, eyes, ears). After the step 815, processing proceeds to a step 820, where the system initiates or maintains hand movement recognition technology and software, including dynamic recognition of the hand state (hand, palm, fingers, fist, etc.). After the step 820, processing proceeds to a step 825, where the system continuously detects, scans and processes capture zones in subsequent video frames (for more information, see FIGS. 4B-4D and the accompanying text). After the step 825, processing proceeds to a test step 830, where it is determined whether a user hand is identified in the current capture zone. If so, processing proceeds to a step 835, where the hand movement recognition software detects the hand status (open, closed, pointing, etc.), palm orientation, direction, speed, and distance from the face.

After the step 835, processing proceeds to a step 840, where the hand trajectory is extrapolated by the system based on the previously processed hand movement. After the step 840, processing proceeds to a step 845, where the system assesses a dynamic risk level of unacceptable face touching based on the extrapolated hand trajectory. After the step 845, processing proceeds to a test step 850, where it is determined whether the risk level is alarming. If so, processing proceeds to a test step 855, where it is determined whether the captured image of the user hand has crossed boundaries of an alert zone (see FIGS. 4B-4D for explanations). If so, processing proceeds to a test step 860, where it is determined whether the alarm has already been initialized for the current episode of hand movement. If so, processing proceeds to a test step 865, where it is determined whether the risk level has increased compared with the risk level for the current alarm intensity. If so, processing proceeds to a step 872, where the alarm intensity is increased to correspond to the risk level. After the step 872, processing proceeds to a step 875, where the system plays the alarm. After the step 875, processing proceeds to a test step 880, where it is determined whether a hand of the user has touched the face of the user. If not, processing proceeds to a test step 882, where it is determined whether the observation period is over. If so, processing is complete; otherwise, processing proceeds to the step 825, which may be independently reached from the step 820.

If it is determined at the test step 880 that the user hand has touched the face, processing proceeds to a test step 885, where it is determined whether the touching is acceptable (see FIGS. 4C-4D and the accompanying text for more information). If so, processing proceeds to a step 890, where the system plays a warning signal (instead of initializing an alarm). After the step 890, processing is complete. If it is determined at the test step 885 that the touching is not acceptable, processing proceeds to a step 895, where the system continuously plays the maximum intensity alarm. After the step 895, processing is complete.

If it is determined at the test step 865 that the risk level has not increased compared to a level reflected in the then current alarm intensity, processing proceeds to the step 875, which may be independently reached from the step 872. If it is determined at the test step 860 that the alarm has not been initialized for the current episode, processing proceeds to a step 870, where the alarm is initialized. After the step 870, processing proceeds to the step 875, which may be independently reached from the test step 865 and the step 872. If it is determined at the test step 855 that the hand image does not cross the boundaries of the alert zone, processing proceeds to the step 825, which may be independently reached from the step 820 and the test step 882. If it is determined at the test step 850 that the assessed risk level of unacceptable face touching is not alarming, processing proceeds to the step 825, which may be independently reached from the step 820 and the test steps 855, 882. If it is determined at the test step 830 that a user hand has not been identified in the capture zone, processing proceeds to the test step 882, which may be independently reached from the test step 880.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to notebooks, smartphones, tablets, and other mobile computers and on wearable devices. Smartphones and tablets may use operating system(s) selected from the group consisting of: IOS, Android OS, Windows Phone OS, Blackberry OS, and mobile versions of Linux OS. Notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of handling unacceptable behavior by a user making a video recording, comprising:
   detecting the unacceptable behavior by the user while the user is making the recording by applying machine learning to data about the user received from one or more capturing devices and by using a predetermined list of bad habits;
   determining recognition accuracy for a particular episode of the unacceptable behavior;
   marking the particular episode in the video recording and adding the particular episode to a list of bad habit episodes for the video recording in response to recognition accuracy of the particular episode being high;
   prompting the user for confirmation of the particular episode in response to the recognition accuracy of the particular episode being low; and
   marking the particular episode in the video recording and adding the particular episode to the list of bad habit episodes for the video recording in response to the recognition accuracy of the particular episode being low and the user confirming the particular episode.

2. The method of claim 1, wherein the machine learning includes an initial training phase that, prior to deployment, is used to obtain a general recognition capability for each item on the predetermined list of bad habits having a low recognition accuracy that has been confirmed by the user.

3. A method, according to claim 1, wherein the confirmation provided by the user is used to improve the recognition accuracy of the machine learning.

4. The method of claim 1, wherein the one or more capturing devices include a laptop with a camera and a microphone, a mobile device, autonomous cameras, add-on cameras, headsets, regular speakers, smart watches, wristbands, smart rings, and wearable sensors, smart eyewear, heads-up displays, headbands, and smart footwear.

5. The method of claim 1, wherein the data about the user includes at least one of: visual data, sound data, motion, proximity and chemical sensor data, heart rate, breathing rate, and blood pressure.

6. The method of claim 1, wherein the list of bad habits includes nail biting, yelling, cursing, making unacceptable gestures, digging one's nose, yawning, blowing one's nose, combing one's hair, slouching, and looking away from a screen.

7. The method of claim 6, wherein technologies used to detect bad habits include facial recognition, sound recognition, speech recognition, gesture recognition, and hand movement recognition.

8. The method of claim 7, wherein yawning is detected using a combination of the facial recognition technology, the sound recognition technology, and the gesture recognition technology.

9. The method of claim 7, wherein face touching is detected using the facial recognition technology and hand movement recognition technology.

10. The method of claim 7, wherein digging one's nose is detected using the facial recognition technology and hand movement recognition technology.

11. The method of claim 1, wherein at least some bad habit episodes from the list of bad habit episodes are presented to the user.

12. The method of claim 11, wherein the user deletes at least one of the bad habit episodes from the video recording.

13. The method of claim 12, wherein a portion of the video recording corresponding to the at least one of the bad habit episodes is re-recorded by the user.

14. The method of claim 1, wherein a list of identified types of bad behavior is presented to the user with examples and recommendations.

15. The method of claim 14, wherein the list of identified types of bad behavior is used for avoidance of bad behavior for future recordings.

16. The method of claim 14, wherein the list of identified types of bad behavior is presented to the user as part of learning program presented to the user.

17. The method of claim 16, wherein the learning program tracks user success in behavior improvement and repeats learning cycles as needed.

18. A method of preventing a user from touching a face of the user, comprising:
   obtaining video frames of the user including the face of the user;
   applying facial recognition technology to the video frames to detect locations of particular portions of the face;
   detecting a position, shape, and trajectory of a moving hand of the user in the video frames;
   predicting a final position and shape of the hand based on the position, shape, and trajectory of the hand and on the locations of the specific portions of the face; and
   providing an alarm to the user in response to predicting that a final position of the hand will be touching the face of the user to prevent the user from touching the face of the user, wherein predicting a final position of the hand includes determining if the hand crosses an alert zone that is proximal to the face.

19. The method of claim 18, wherein the alarm varies according to a predicted final shape of the hand and according to predicting that a final position of the hand will be touching a specific one of the particular portions of the face.

20. The method of claim 19, wherein the predicted final shape of the hand is one of: an open palm and open fingers.

21. A method of preventing a user from touching a face of the user, comprising:

detecting a position, shape, and trajectory of a moving hand of the user based on one or more sensors from a wearable device of the user;

predicting a final position and shape of the hand based on the position, shape, and trajectory of the hand and on the locations of the specific portions of the face; and providing an alarm to the user in response to predicting a final position of the hand will be touching the face of the user to prevent the user from touching the face of the user, wherein predicting the final position and shape of the hand uses machine learning that is adapted to the user during a training phase.

22. The method of claim 21, wherein the wearable device is a smart watch and at least one of the position, shape, and trajectory of the moving hand is determined using sensors of the smart watch.

23. The method of claim 21, wherein the wearable device is a smart ring and at least one of the position, shape, and trajectory of the moving hand is determined using a proximity sensor, an accelerometer or a gyroscope of the smart ring.

24. The method of claim 21, wherein the wearable device is smart glasses and at least one of the position, shape, and trajectory of the moving hand is determined using a proximity sensor of the smart glasses.

25. A non-transitory computer readable medium containing software that handles unacceptable behavior by a user making a video recording, the software comprising:

executable code that detects the unacceptable behavior by the user while the user is making the recording by applying machine learning to data about the user received from one or more capturing devices and by using a predetermined list of bad habits;

executable code that determines recognition accuracy for a particular episode of the unacceptable behavior;

executable code that marks the particular episode in the video recording and adds the particular episode to a list of bad habit episodes for the video recording in response to recognition accuracy of the particular episode being high;

executable code that prompts the user for confirmation of the particular episode in response to the recognition accuracy of the particular episode being low; and executable code that marks the particular episode in the video recording and adds the particular episode to the list of bad habit episodes for the video recording in response to the recognition accuracy of the particular episode being low and the user confirming the particular episode.

\* \* \* \* \*